J. F. PALMER.
CARCASS FABRIC FOR PNEUMATIC TIRES.
APPLICATION FILED NOV. 27, 1916.
1,344,145.
Patented June 22, 1920.
2 SHEETS—SHEET 1.
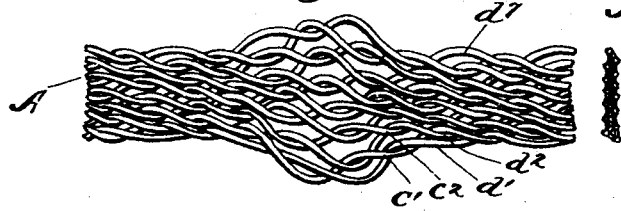
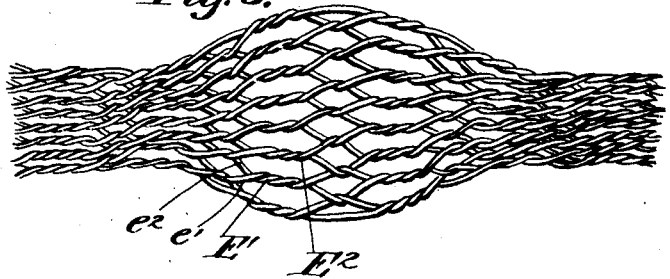
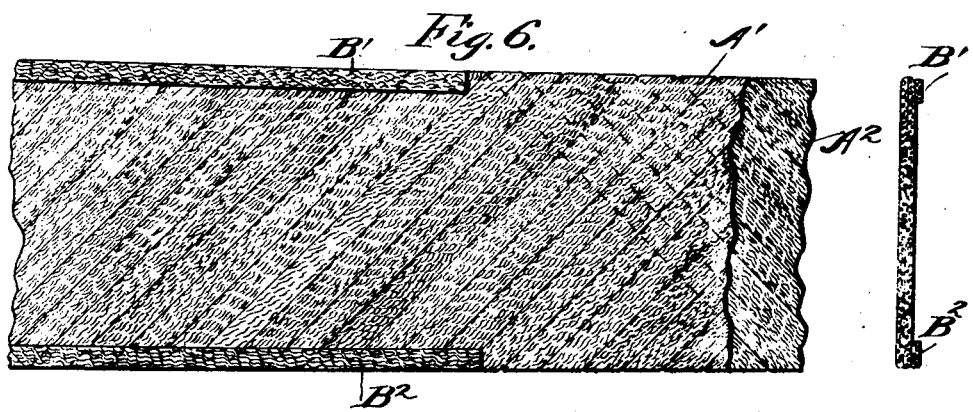
Witness:
C. Burnap
Inventor:
John F. Palmer
By Sheridan, Wilkinson & Scott, Att'ys J. F. PALMER.
CARCASS FABRIC FOR PNEUMATIC TIRES.
APPLICATION FILED NOV. 27, 1916.
1,344,145. Patented June 22, 1920.
2 SHEETS—SHEET 2.
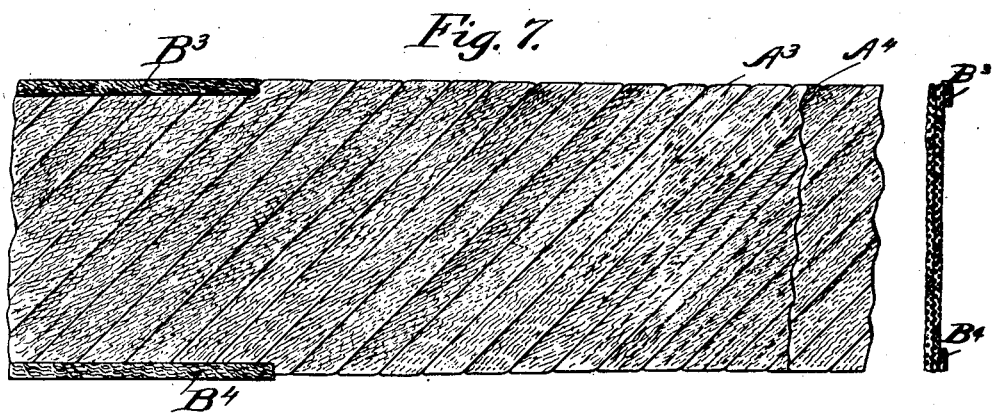
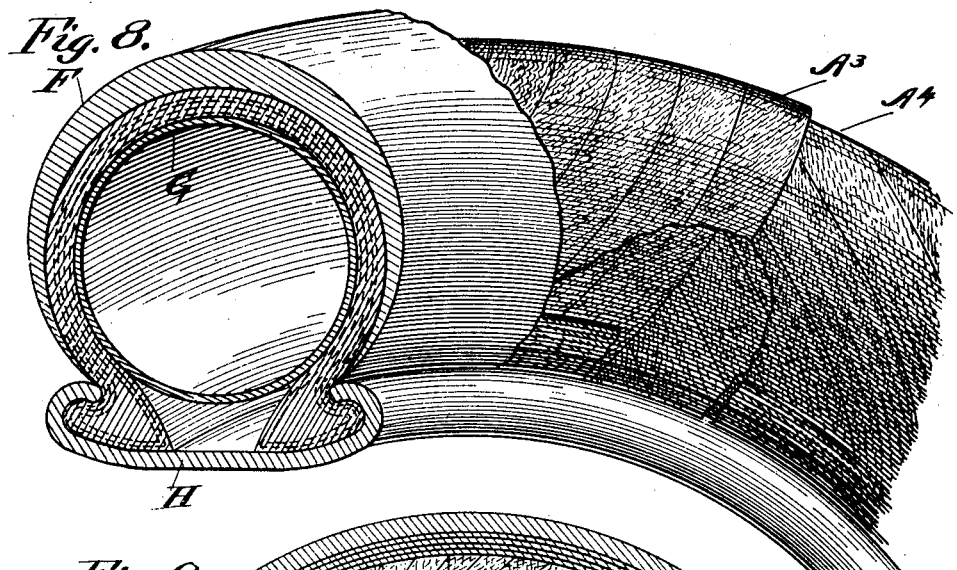
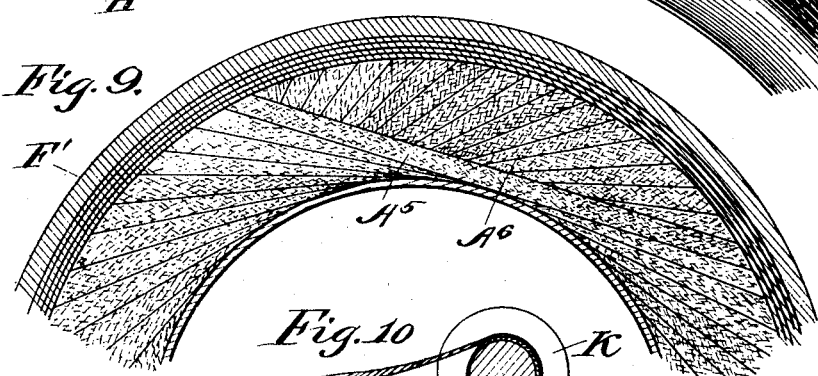
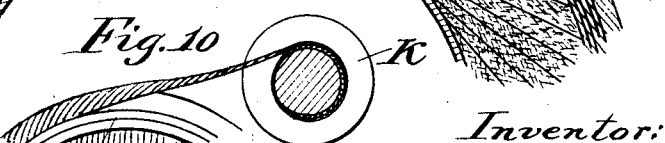

UNITED STATES PATENT OFFICE.

JOHN F. PALMER, OF RIVERSIDE, ILLINOIS.

CARCASS FABRIC FOR PNEUMATIC TIRES.

1,344,145.  Specification of Letters Patent.  Patented June 22, 1920.

Application filed November 27, 1916. Serial No. 133,748.

*To all whom it may concern:*

Be it known that I, JOHN F. PALMER, a citizen of the United States, residing at Riverside, in the county of Cook and State of Illinois, have invented certain new and useful Improvements in Carcass Fabric for Pneumatic Tires, of which the following is a specification.

My invention relates to pneumatic tires and more particularly to a pneumatic tire comprising an improved reinforcing fabric.

In order that a pneumatic tire may withstand the great pressure of the air contained therein and the shocks incident to the usage of such tires, it is necessary to embed in the rubber of the tire a strain resisting fabric to prevent the distortion of the tire and maintain it in its normal symmetrical form.

It is desirable that the strain resisting fabric should be so constructed as to form a substantially unyielding power transmitting medium intermediate of the wheel rim and the surface traveled over, and at the same time possess adaptability to the contour of the tire casing without strain or wrinkle. It is further desirable that the strain resisting fabric should have surfaces of a character to produce a strong adhesion between the same and the rubber of the tire casing in which it is embedded.

The primary object of my invention is to provide a pneumatic tire having an improved reinforcing fabric which will resist strains in a direction to effectively transmit power, but which will yield in directions to conform to the curvature of the tire, and to the various shapes imparted to the tire in usage.

A further object of my invention is to provide an improved carcass fabric for pneumatic tire casings, which will comprise strain resisting members so related and connected that the carcass, although formed in a flat strip of fabric, will be so adaptable as to have imparted to it the curvature of the tire when it is fitted over the mandrel.

A still further object of my invention is to provide a pneumatic tire having an improved reinforcing fabric, which will be simple in construction and convenient in application, and which will contribute to the efficiency and durability of the tire.

My invention will be more fully disclosed hereinafter with reference to the accompanying drawings in which the same is illustrated as embodied in convenient and practical forms, and in which—

Figure 1 is an enlarged plan view of a portion of a band embodying one form of my improved reinforcing fabric, the threads, or primary members, of such band being laterally separated to show their relative arrangement;

Fig. 2 is a cross-section of Fig. 1;

Fig. 3 is a plan view of my improved reinforcing fabric embodied in tubular form;

Fig. 4 is a cross-section of Fig. 3;

Fig. 5 is a view similar to Fig. 1 showing a modified form of my improved reinforcing fabric;

Fig. 6 is a plan view of a portion of a strip of carcass fabric composed of superposed crossed diagonal sections of the improved reinforcing band;

Fig. 7 is a plan view of a portion of a strip of carcass fabric in which the superposed sections of the band all extend in the same direction in the two plies;

Fig. 8 is a perspective view of a portion of a tire embodying my invention, parts being broken away to better show the arrangement of the reinforcing fabric;

Fig. 9 is a central longitudinal section through a pneumatic tire casing showing another arrangement of my improved reinforcing fabric; and Fig. 10 is a diagrammatic view showing a strip of carcass fabric supported on a reel and being transferred therefrom to a mandrel on which a tire is being built.

Similar reference characters are used to designate similar parts in the several figures of the drawings.

My strain resisting carcass fabric for pneumatic tires comprises a plurality of longitudinal threads or cords which are so interlocked with each other that the resulting fabric will be substantially unyielding in a longitudinal direction, but may be expanded or contracted transversely as occasion may require in its use. The threads or cords are preferably so arranged that each thread passes under and thence over the two adjacent threads. In Fig. 1 reference characters $c^1$, $c^2$, etc., designate the threads in one series and reference characters $d^1$, $d^2$, etc., designate the threads of the other series. It will be seen that the thread $c^1$ passes successively under the threads $d^1$, $d^2$ and thence over them throughout the length of the fabric. It will also be seen that each of the threads of the other series, as, for instance $d^2$, passes successively under and thence over the two threads $c^1$ and $c^2$.

When my improved fabric is embodied in flat form A, as shown in Figs. 1 and 2, the edge threads $d^1$ and $d^7$ successively pass under and over only one of the adjacent cords of the other series, but when my invention is embodied in tubular form B, as shown in Figs. 3 and 4, each of the threads of each of the series passes continuously under and over the two adjacent threads of the other series.

In the modified form of my invention shown in Fig. 5, a plurality of twisted members $E^1$, $E^2$, etc. are employed, each of such members being composed of two strands $e^1$, $e^2$. The strands of each member are separated at predetermined intervals and intertwined with the separated strands of the adjacent members. For instance, the strand $e^1$ of the member $E^1$ is separated from the strand $e^2$, and intertwined with the strand $e^1$ of the adjacent member E, while the strand $e^2$ of member $E^1$ is intertwined with the strand $e^1$ of the adjacent member $E^2$. In, this embodiment of my invention it will be observed that two strands or threads are twisted into a cord for a predetermined distance and the individual strands or threads then separated so as to be intertwined with the separated strands of the adjacent cords or members.

Prior to using my improved fabric for reinforcing pneumatic tire casings, or for like uses, the bands may be impregnated with rubber in solution, and when tubular in form, the tube may be flattened so as to in effect be a double layer of fabric. My improved fabric, however, may be coated or impregnated with rubber in any of the usual commercial methods for accomplishing this purpose. The amount of rubber forced into and around the threads of my improved fabric may be governed by applying tension to the fabric during the process of coating or impregnating the same with rubber, inasmuch as the greater the longitudinal tension imparted to the fabric, the less will be the spaces around the threads to be filled with the rubber.

In constructing tires embodying my invention, a strip of reinforcing fabric may first be made in flat form of the desired width, and then placed around a mandrel upon which the tire is built, and so stretched as to smoothly conform to the contour of the mandrel. In Fig. 6, I have shown a portion of a strip of carcass fabric comprising two superposed layers $A^1$ and $A^2$ each formed of sections of the band laid edge to edge, the bands in the layers extending in intersecting directions. Adjacent the longitudinal edges of the strip are provided comparatively non-extensible bands $B^1$ and $B^2$, so that when a strip is placed upon the mandrel in building a tire, the edges will lie smooth adjacent the inner edges of the tire casing, while the strip adjacent its longitudinal center may be elongated to conform to the curvature of the tire casing.

In Fig. 7, I have shown a portion of a strip of carcass fabric comprising superposed layers $A^3$ and $A^4$, each layer formed of sections of the band laid edge to edge diagonally of the carcass, the sections in the two layers extending in the same direction, but the sections in one layer being staggered with relation to the sectional bands in the other layer. In forming a carcass of a strip of fabric such as shown in this figure, two plies of such strip are employed, the sections of the bands in one strip crossing the sections of the bands in the other strip, as clearly shown in Fig. 8 of the drawings. In the strip of carcass fabric in the form shown in Fig. 7, comparatively non-extensible members may also be provided adjacent the longitudinal edges thereof, as indicated at $B^3$ and $B^4$, in order that the edges of the strip which lie adjacent the inner edges of the tire casing may lie smoothly.

When the strips of carcass fabric are placed upon the mandrel in building the tire, they will have the arrangement shown in Fig. 8 in which F indicates the tread covering of the tire casing, G the inner tube, and H the rim upon which the casing is mounted. While I have shown a clencher type of rim, yet it will be obvious that my invention will be equally well embodied in a tire having straight side edges.

It will be observed that in Figs. 6 and 7 the strips of reinforcing carcass fabric comprise secondary members, or bands, comprised of strain resisting primary members, or threads, disposed at an angle to the edge of the strips, so that when the strips are applied to the mandrel, or former, upon which the tire is built the fabric is susceptible of being elongated in the middle to accommodate the larger circumferential measurement of the tire on the tread while the edges of the fabric which are brought down to the bead line have a circumferential measurement corresponding to the inner edges of the tire. In Fig. 10 I have illustrated diagrammatically a strip of my improved reinforcing fabric wound upon a supporting reel K, from which it is wound on a mandrel L, upon which a tire is built. It will therefore be seen that my improved carcass fabric may be applied in constructing tires in the same manner in which other strips of reinforcing fabric are commonly incorporated in the tire casing during its construction.

In the use of the improved fabric in the manufacture of a carcass, such as shown in Fig. 6 or Fig. 7, a strip of the width necessary for the size of the tire to be made is prepared by arranging sections of the bands edge to edge diagonally of the strip, and then forming a superposed ply by laying other sections of the band edge to edge, the sections of the second ply either extending in a direction intersecting the direction of the sections of the first ply, as shown in Fig. 6, or in the same direction, with the abutting edges of the sections in one ply breaking joints with the abutting edges of the sections of the other ply, as shown in Fig. 7. Two of the two ply strips shown in Fig. 7 are to be superposed with the sections of the bands in the two strips extending in intersecting directions. The sections of the bands are stuck together by means of rubber, or any suitable material, introduced in and around the cords, or primary members, of the bands as in ordinary practice of solutioning, frictioning, spreading, etc. Inasmuch as the strip of carcass fabric is composed of sections of bands adhesively connected together, it will be apparent that a portion of a strip of any desired length may be disconnected from a continuous strip by merely pulling apart adjacent sections of bands at any desired point in the continuous strip.

The carcass so formed is analogous to the bias cut strip of ordinary square-woven tire fabric, but by reason of the absence of interwoven cross-threads as primary members in any one ply, the whole aggregate of plies will stretch freely along the longitudinal center to any extent necessary to accommodate the increased circumferential measurement of the tread portion of the tire. This stretching of the carcass strips opens the interstices between the threads into diamond-like meshes, thereby permitting the free passage of molten rubber between the threads during the vulcanization, with consequent maximum firmness in the final amalgamation of all of the elements of the tire into one homogeneous mass, the tread rubber in effect being secured to the carcass of the tire by numerous rubber rivets extending from the tread practically through the body of the carcass.

If it is desired my improved tire may be constructed by laying the separate sections of bands in layers directly upon the mandrel, in lieu of first forming the sections of bands into a flat strip of reinforcing fabric.

My invention may also be embodied in pneumatic tires in the manner shown in Fig. 9, in which superposed layers of reinforcing fabric $A^5$ and $A^6$ are formed by winding the band continuously around the mandrel, each portion of the band which extends from one tread point to another lying in tangential relation to the inner edge of the tire. Short pieces of the band may be utilized in the same manner by having the ends of the adjacent pieces overlapped, so that the pieces extend end to end, and in effect, forming a continuous band.

There is in short no type of tire in which flat reinforcing members are used as distinguished from round cords that cannot be manufactured with greater facility and with more valuable results by the practice of my invention, as the primary members are inter-woven longitudinally of the bands, each member maintaining its path constant throughout its length so far as it relates to the other members of the band, and the spiral course of each member being equal to each other member, contributing unity of action with resulting maximum strength under stresses, incapable of achievement by any other means, as in a round cord the primary members must of necessity describe a thinner spiral in their course through the cord than where next, or subsequently, twisted into larger cords, each doubling or cabling further disturbing the inequality of the spirals of the primary members with the result that the total breaking strength of the cable cord falls below the aggregate breaking strength of the members thereof.

What I claim is:

1. A carcass fabric for pneumatic tires comprising superposed layers of bands, the constituent primary members of each band being interwoven in substantially parallel relation.

2. A carcass fabric for pneumatic tires comprising layers of bands, the bands in adjacent layers crossing each other, and the constituent primary members of each band being uniformly spirally intertwined with the adjacent members.

3. A pneumatic tire or other flexible inflatable closure comprising an embedded reinforcing fabric composed of longitudinal primary members, adjacent members being intertwined.

4. A pneumatic tire or other flexible inflatable closure comprising an embedded reinforcing fabric formed solely of longitudinally disposed primary members, adjacent members being intertwined.

5. A pneumatic tire or other flexible inflatable closure comprising an embedded reinforcing fabric formed solely of longitudinal primary members, each primary member being intertwined with the adjoining primary members on the opposite sides thereof.

6. A pneumatic tire or other flexible inflatable closure comprising an embedded reinforcing fabric, primary members of which are longitudinal and connected with each other solely by intertwining adjacent members.

7. A pneumatic tire or other flexible inflatable closure comprising an embedded reinforcing fabric formed of a plurality of superposed bands, the primary members of each band being intertwined with the adjacent members.

8. A carcass fabric for pneumatic tire casings comprising a strip composed of flat bands formed solely of primary strain resisting members extending longitudinally of the bands and interwoven with each other, said bands being disposed angularly with respect to the edges of the strip.

9. A carcass fabric for pneumatic tire casings comprising a strip of uniform thickness composed solely of strain resisting primary members all extending at an angle to the edges of the strip and interwoven with each other.

10. A carcass fabric for pneumatic tire casings comprising a strip composed of flat bands formed solely of primary strain resisting members extending longitudinally of the bands, said primary members and bands being disposed angularly with respect to the edges of the strip.

11. A carcass fabric for pneumatic tire casings comprising a strip composed of superposed layers of flat bands, the bands in two adjacent layers being angularly disposed with relation to each other, and to the edges of the strip, and each band formed solely of primary strain resisting members extending longitudinally of the bands.

12. A carcass fabric for pneumatic tires, comprising superimposed layers of bands, the constituent primary members of each band being interwoven in substantially parallel relation so that adjacent primary members tend to assume a closer and more forcible relation while under tension, thereby securely gripping the particles of resilient material inserted between them.

13. A carcass fabric for pneumatic tires, comprising superimposed layers of bands, the constituent primary members of each band being intertwined with each other and adapted to be readily filled with resilient material whereby said intertwined primary members securely hold said filling material in closer relation as the tension on said bands is increased.

In testimony whereof I have subscribed my name.

JOHN F. PALMER.